United States Patent [19]

Leppek et al.

[11] Patent Number: 5,080,447
[45] Date of Patent: Jan. 14, 1992

[54] ANTILOCK BRAKE CONTROLLER WITH BRAKE MODE FILTER

[75] Inventors: Kevin G. Leppek, Troy; Martin A. Hogan, Northville, both of Mich.; Peter J. Spadafora, Howald, Luxembourg; Alan J. Lee, Farmington Hills, Mich.

[73] Assignees: General Motors Corporation, Detroit, Mich.; Delco Electronics Corporation, Kokomo, Ind.

[21] Appl. No.: 578,820

[22] Filed: Sep. 6, 1990

[51] Int. Cl.⁵ .................................. B60T 8/58
[52] U.S. Cl. ............................ 303/100; 303/109; 303/DIG. 4
[58] Field of Search ............ 303/113, 114, 115, 116, 303/119, 100, 93, 105, 108, DIG. 4, 106, 109; 364/426.02

[56] References Cited

U.S. PATENT DOCUMENTS

| | | | |
|---|---|---|---|
| 3,944,289 | 3/1976 | Jones | 303/106 |
| 4,673,225 | 6/1987 | Kade | 303/DIG. 4 |
| 4,720,794 | 1/1988 | Skarvada | 303/109 X |
| 4,755,945 | 7/1988 | Kade et al. | 303/100 |
| 4,761,741 | 8/1988 | Agarwal et al. | 303/DIG. 4 |
| 4,783,127 | 11/1988 | Kade et al. | 303/DIG. 4 |
| 4,807,134 | 2/1989 | Agarwal et al. | 303/100 |
| 4,824,184 | 4/1989 | Spadafora et al. | 364/426.02 |
| 4,881,784 | 11/1989 | Leppek | 303/100 |

Primary Examiner—Matthew C. Graham
Attorney, Agent, or Firm—Howard N. Conkey

[57] ABSTRACT

A schedule of brake pressure ramp rates is provided in a vehicle antilock brake controller as a function of predetermined wheel parameters. The ramp rates associated with the specific values of the wheel parameters are filtered by limiting the changes in ramp rate to a next higher ramp rate from the schedule of rates when the ramp rate called for by the wheel parameters is greater than the present ramp rate and to a next lower ramp rate from the schedule of rates when the ramp rate called for by the wheel parameters is less than the present ramp rate.

4 Claims, 4 Drawing Sheets

ANTILOCK BRAKE CONTROLLER WITH BRAKE MODE FILTER

BACKGROUND OF THE INVENTION

This invention relates to an antilock braking system and more particularly to such a system providing for filtering of the control modes selected in response to wheel operating parameters.

When the brakes of a vehicle are applied, a braking force is generated between the wheel and the road surface that is dependent upon various parameters which include the wheel surface condition and the amount of slip between the wheel and the road surface. This braking force increases as slip increases until a critical value of slip is surpassed. Beyond the critical value of slip, the braking force decreases and the wheel rapidly approaches lockup. Therefore, to achieve stable braking, an antilock control system seeks to operate wheel slip at or near the critical slip value.

An antilock control system achieves this objective by detecting an incipient lockup condition of the wheel. Upon detecting such a condition, the antilock control system releases pressure at the wheel brake to allow recovery from the incipient lockup condition. Upon recovery, brake pressure is reapplied to the wheel. This cycle is rapidly repeated until the vehicle stops or until the operator applied braking pressure is reduced to a level below that which produces an incipient wheel lockup condition.

The release and apply phases of brake pressure control during antilock controlled braking may each provide for variable rates of change in brake pressure as a function of selected wheel parameters such as wheel slip and acceleration. For example, the reapply phase of brake pressure control following recovery from an incipient wheel lockup condition may include a plurality of brake pressure control modes stored in a lookup table each having a pressure ramp rate associated therewith. The modes are stored as a function of selected wheel parameters such as wheel slip and wheel acceleration to provide a schedule of sequential ramp rates and are used to establish the desired pressure ramp rate corresponding to the specific combination of values of those parameters. The table of brake pressure control modes may provide for progressively decreasing pressure ramp rates as the wheel approaches an incipient wheel lockup condition as represented by increasing wheel slip and decreasing wheel acceleration (increasing wheel deceleration).

In this form of antilock controlled braking having a plurality of ramp rates for the apply and/or release phases of pressure modulation, as a result of factors such as wheel speed noise associated with road surface irregularities, etc., there is a potential for irregular transitions between the ramp rates resulting in large momentary shifts in the brake pressure ramp rate. This shift is undesirable particularly at low ramp rates that are generally associated with approaching critical slip where it is undesirable to overshoot the pressure establishing the critical slip value and therefore the maximum braking effort.

SUMMARY OF THE INVENTION

In general, this invention provides for the control of the brake pressure ramp rate in an antilock brake controller providing for a plurality of selectable ramp rates so as to prevent irregularities or momentary excessive large shifts in the brake pressure ramp rate. Generally, this is provided for by limiting the rate of change in the ramp rate called for by the controlling wheel parameters such as wheel slip and acceleration so as to inhibit the large ramp rate shifts otherwise associated with noisy controlling parameters.

In one form of the invention, the ramp rate as established by the wheel parameters is filtered in a manner to establish a controlled variation in the ramp rate in response to changing wheel parameters.

In another aspect of this invention, a schedule of ramp rates is provided as a function of predetermined wheel parameters. The ramp rates associated with the specific values of the wheel parameters are filtered by limiting the changes in ramp rate to a next higher ramp rate from the schedule of rates when the ramp rate called for by the wheel parameters is greater than the present ramp rate and to a next lower ramp rate from the schedule of rates when the ramp rate called for by the wheel parameters is less than the present ramp rate. This control of ramp rates provides an orderly transition between the various pressure ramp rates and prevents irregular transitions between ramp rates with associated large momentary shifts in the ramp rate resulting from, for example, wheel speed noise associated with road surface irregularities.

DESCRIPTION OF THE DRAWINGS

The invention may be best understood by reference to the following description of a preferred embodiment and the drawings in which.

DESCRIPTION OF THE PREFERRED EMBODIMENT

Figure 1:
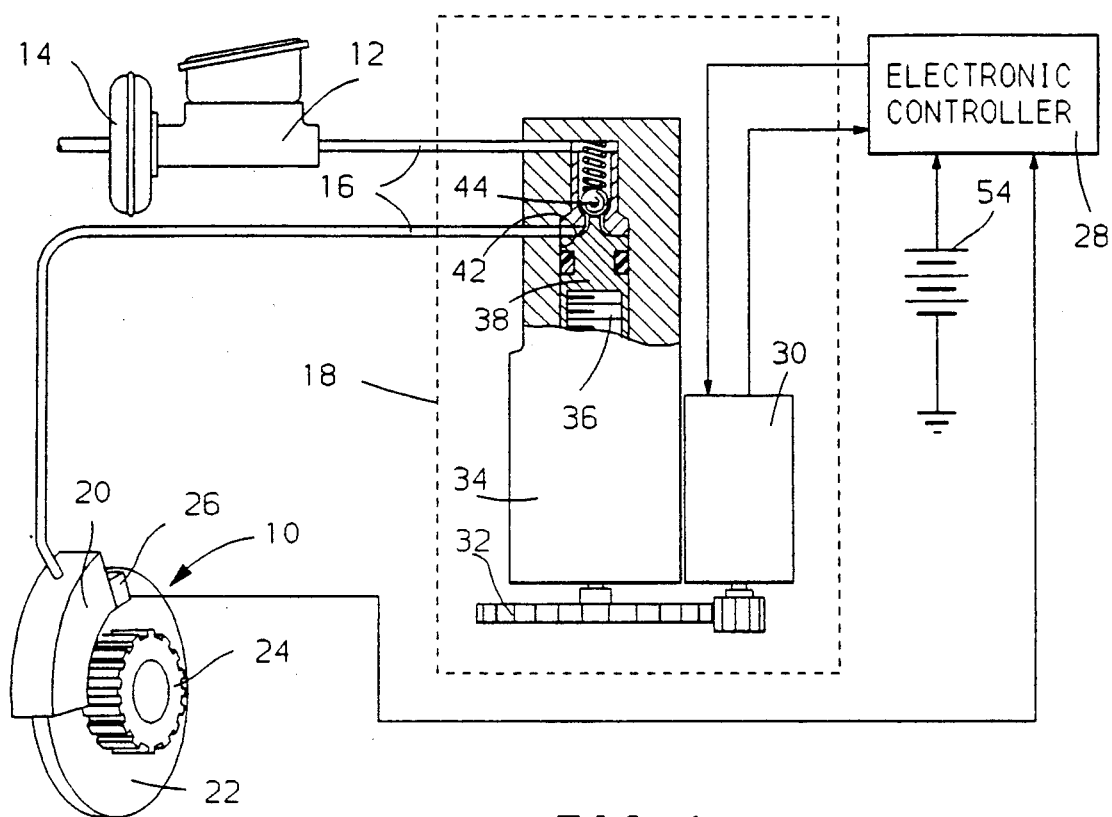
FIG. 1 is a diagram of a wheel braking system including a motor driven pressure modulator for limiting the wheel brake pressure for antilock brake control.

A wheel lock control system for a wheel of a motor vehicle is illustrated in FIG. 1. In general, the wheel includes a brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake lines 16 and a pressure modulator 18. The brake unit 10 is illustrated as a disc brake system that includes a caliper 20 located at a rotor 22. The wheel includes a wheel speed sensing assembly comprised of an exciter ring 24 rotated with the wheel and an electromagnetic sensor 26 which monitors the rotation of the exciter ring to provide a signal having a frequency proportional to the speed of the wheel. The wheel speed signal from the sensor 26 is provided to an electronic controller 28.

The pressure modulator 18 is controlled by the electronic controller 28 to limit the brake pressure applied to the wheel brake assembly 10 to prevent wheel lockup. The modulator 18 is illustrated in an inactive position where it is transparent to the braking system. This is the modulator home position during normal vehicle braking. In general, when the controller 28 senses a braking condition whereat the wheel is approaching an incipient wheel lock, the pressure modulator 18 is controlled to regulate the braking pressure to the wheel to maintain the braking of the wheel in a stable braking region.

The pressure modulator 18 includes a DC torque motor 30 whose output shaft drives a gear train 32 which, in turn, rotates a linear ball screw actuator 34. The ball screw actuator contains a linearly stationary ball screw which, when rotated, linearly positions a nut 36. The nut 36 terminates in a piston 38 such that as the linear ball screw rotates, the piston 38 is either extended or retracted depending upon the direction of rotation of the torque motor 30. The modulator 20 includes a housing 40 in which a cylinder 42 is formed. The piston 38 is reciprocally received within the cylinder 42. The cylinder 42 forms a portion of the fluid path between the master cylinder 12 and the wheel brake unit 10. Included within this fluid path is a normally closed ball check valve 44 which, when closed, isolates the master cylinder 12 from the wheel brake unit 10. The ball check valve 44 is operated to an open position by the piston 38 when it is positioned in an extended position within the cylinder 42 as illustrated in FIG. 1. This position is the home position of the modulator 18.

When the ball check valve 44 is opened, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator. However, when the torque motor 30 is operated by the electronic controller 28 to modulate the braking pressure in the wheel brake unit 10, the piston 38 is retracted allowing the ball check valve to seat and isolate the master cylinder 12 from the wheel brake unit 10 as long as the pressure in the cylinder 42 is less than the pressure from the master cylinder 12. Further retraction of the piston 48 functions to increase the volume in the cylinder 42 thereby decreasing the pressure applied to the wheel brake unit 10. By controlling the DC torque motor 30, pressure at the wheel brake can be modulated to controlled values less than the master cylinder 12 pressure output until such time that the piston 38 again unseats the ball check valve 44 or until the pressure generated by the pressure modulator at the wheel brake unit 10 exceeds the fluid pressure output of the master cylinder 12. When this latter condition exists, the ball check valve 44 is opened by the differential fluid pressure which limits the pressure of the wheel brake unit 10 at the master cylinder 12 pressure. In this manner, the wheel cylinder pressure can never exceed the operator established pressure.

Figure 2:
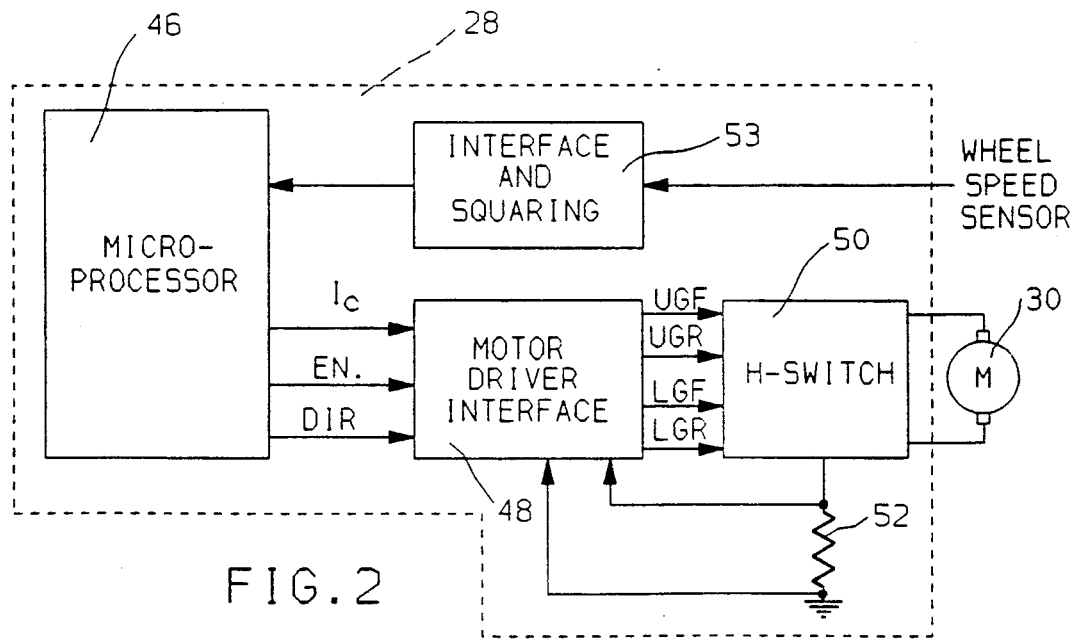
FIG. 2 is a diagram of the electronic controller of FIG. 1 for controlling the current to the motor of the motor driven pressure modulator of FIG. 1.

Referring to FIG. 2, the electronic controller 28 of FIG. 1 is illustrated and generally takes the form of a digital computer based controller. The controller includes a microprocessor 46 that is standard in form and includes the standard elements such as a central processing unit which executes an operating program permanently stored in a read-only memory which also stores tables and constants utilized in controlling the modulator 18, an analog-to-digital converter, a random access memory and input/output circuitry utilized to provide motor control signals to a motor driver interface circuit 48. The input/output circuit further includes input ports for receiving the wheel speed signal from the output of an interface and squaring circuit 53 having in turn an input from the wheel speed sensor 26.

The motor driver interface circuit 48 receives an enable signal EN, a motor current command signal $I_c$ and a forward/reverse direction signal DIR from the microprocessor 46 and controls an H-switch driver 50 to establish the commanded motor current $I_c$ in the required forward or reverse direction. The current to the torque motor 30 is controlled to the commanded value via a closed loop that responds to the actual motor current represented by the voltage across a sense resistor 52. In response to the direction and motor current commands, the motor driver interface 48 energizes the H-switch upper and lower forward gates via the upper gate signal UGF and lower gate signal LGF to control the DC torque motor 30 in the forward direction to apply brake pressure and energizes the H-switch upper and lower reverse gates via the signals UGR and LGR to control the DC torque motor 30 in the reverse direction to retract the piston 38 to reduce pressure at the wheel brake. The microprocessor 46 may take the form of a Motorola single chip microcomputer MC68HC11. The motor driver interface 48 and H-switch 50 may take the form of the driver illustrated in the U.S. Pat. No. 4,835,695 issued May 30, 1989.

During a typical antilock brake control cycle established by the system of FIGS. 1 and 2, when an incipient wheel lock condition is sensed, a release phase is indicated and the motor current is first stored as a measure of the brake pressure at the time the incipient wheel lock condition was first sensed, after which the motor current is controlled to quickly retract the piston 38 to release brake pressure to allow recovery from the incipient wheel lock condition. This reversal is accomplished by commanding a reverse motor direction and setting the command current at a maximum reverse current value. The motor driver interface 48 responds to these commands by energizing the upper and lower reverse H-switch gate switches to drive the motor 30 in the reverse direction at the commanded current level.

When recovery from the incipient wheel lock condition is sensed, an apply phase is indicated and the brake pressure is reapplied first to a significant fraction of the pressure existing at the time the incipient wheel lock condition was sensed and thereafter ramped. This is accomplished by commanding a forward motor direction and setting the command current at an initial value that is a significant fraction of the stored current when the incipient wheel lock condition was sensed and thereafter ramping the value of the commanded motor current. The motor driver interface responds to these commands by energizing the upper and lower H-switch gate switches to drive the motor in a forward direction at the commanded level. The brake pressure is ramped until such time that an incipient wheel lockup condition is again sensed at which time the cycle is repeated.

The rate at which the brake pressure is ramped is a function of predetermined wheel parameters. In this embodiment, the brake pressure ramp is established as a predetermined function of wheel slip and wheel acceleration such that the pressure apply ramp rate becomes smaller as the wheel approaches an incipient wheel lockup condition represented by increasing wheel slip and wheel deceleration. In the preferred embodiment, the schedule of ramp rates as a function of the wheel parameters is provided by storing a plurality of brake apply modes in a lookup table as a function of the wheel parameters of acceleration and slip. The mode corresponding to the specific combination of values of wheel slip and wheel acceleration is retrieved from the lookup table and the current to the torque motor 30 controlled to establish the corresponding pressure ramp rate.

If the particular apply mode controlling the pressure ramp rate were established as a function of wheel slip and wheel acceleration without limitation, there is a potential for non-orderly transitions between the apply rate modes retrieved from the lookup table. For example, due to noise in the wheel speed signal and the wheel acceleration derived therefrom, the apply mode retrieved from the lookup table may skip an intermediate mode resulting in a large momentary shift in the pressure ramp rate. This invention inhibits such a transition and assures that an orderly transition is made between pressure ramp rates by filtering the modes retrieved from the table so as to assure that no pressure ramp rates are skipped as a result of the input noise signals. By preventing the bypassing of an intermediate ramp rate, an orderly transition between the apply rates is provided to provide more stable control of the wheel brake pressure.

Figure 3:
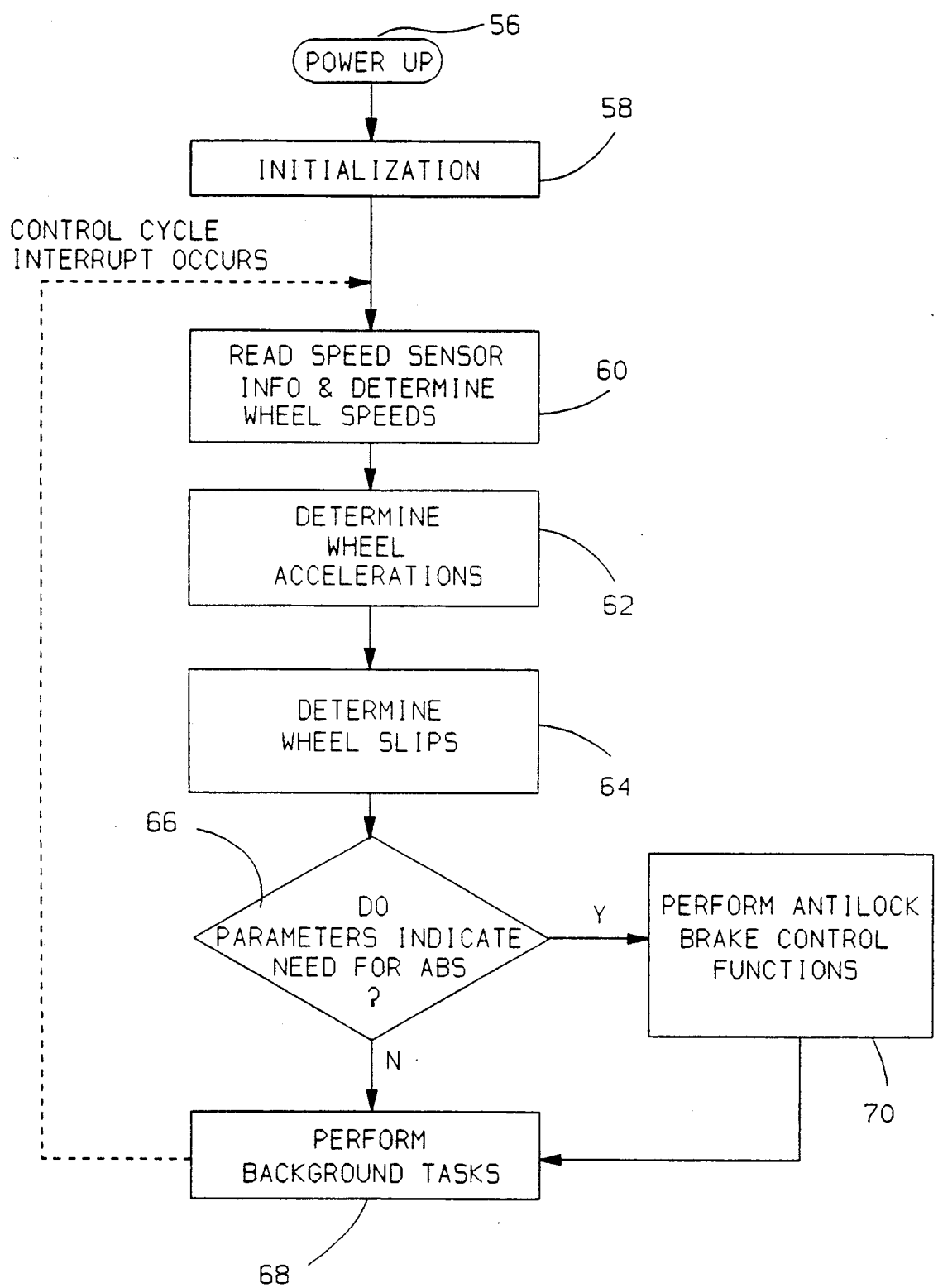
FIGS. 3, 4 and 5 are flow diagrams illustrating the operation of the electronic controller of FIG. 1 in accord with the principles of this invention.
Figure 4:
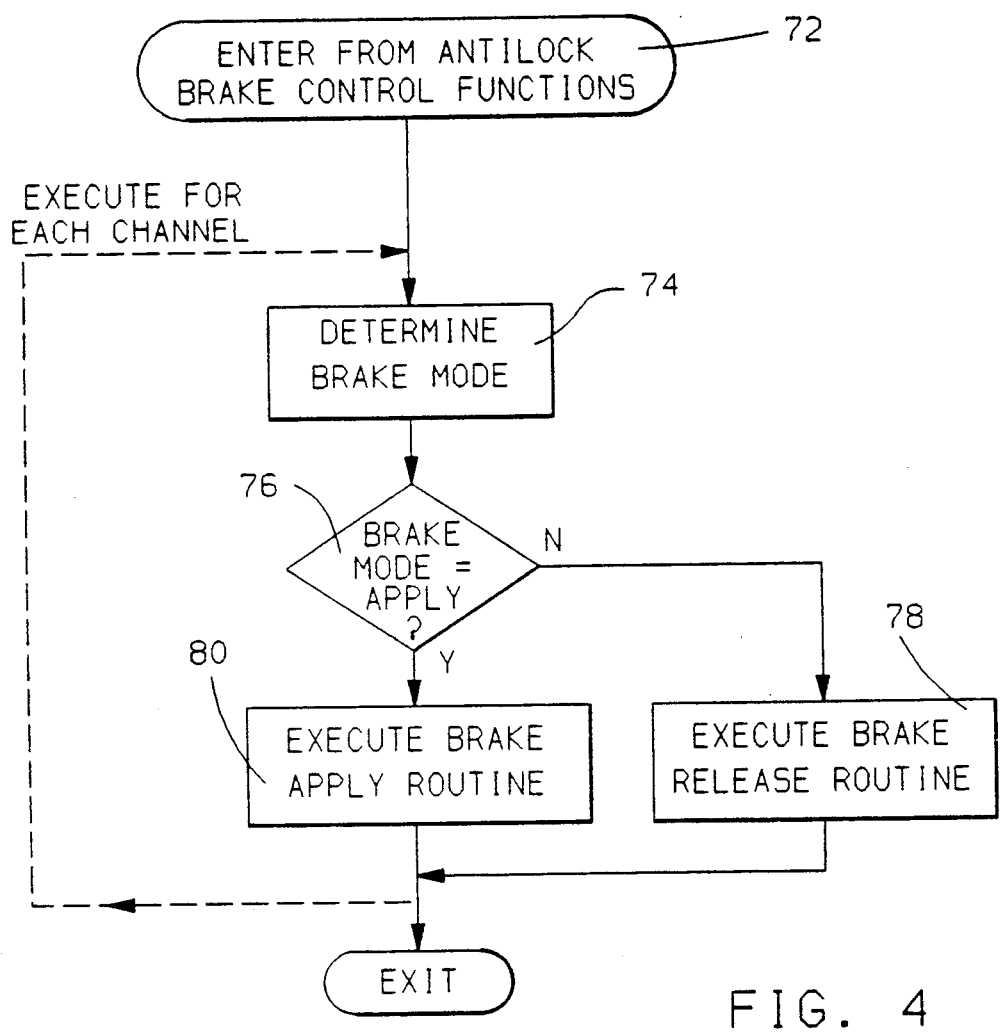
Figure 5:
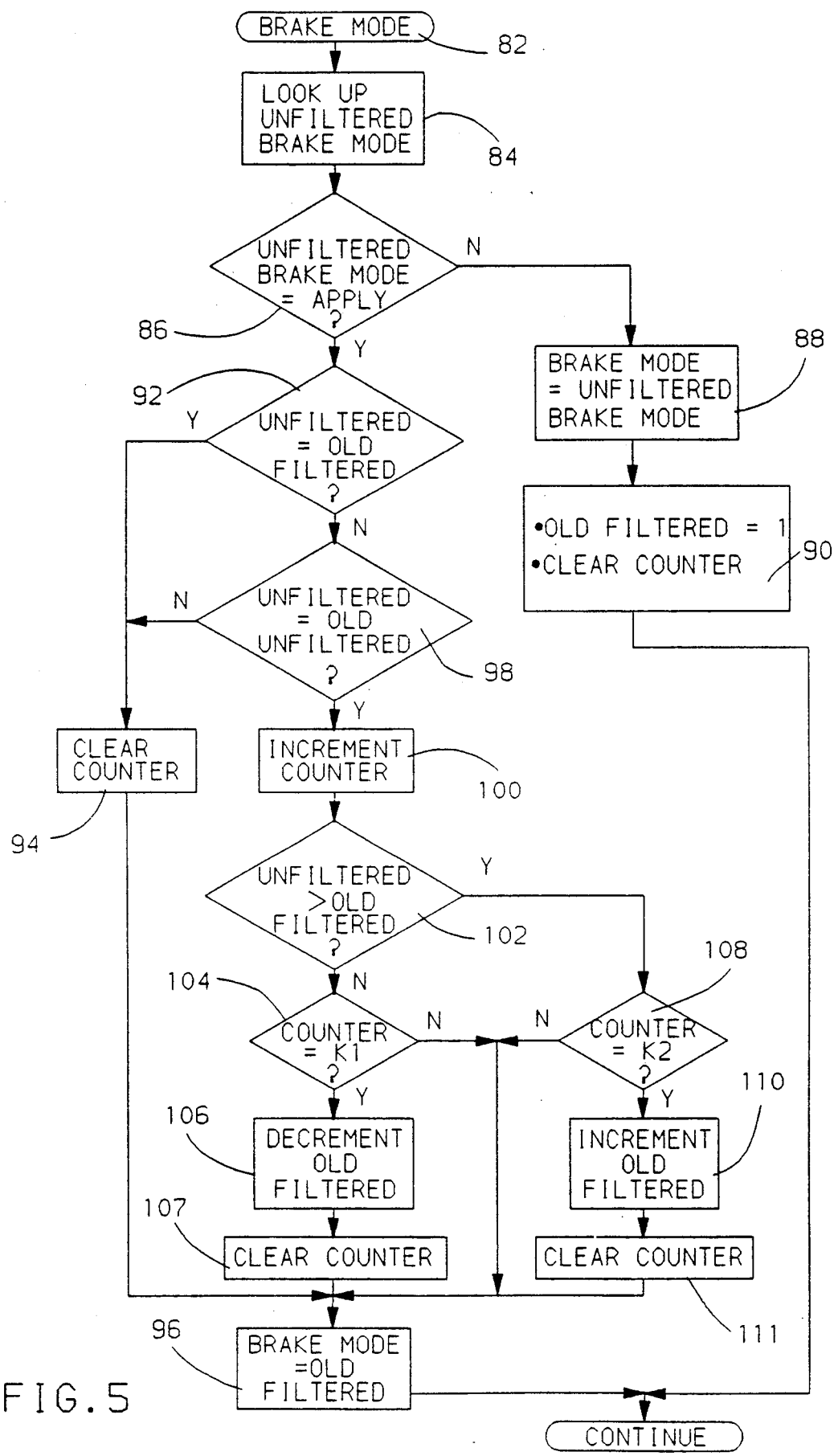

The operation of the electronic controller 28 in controlling the DC torque motor 30 in accord with this invention is illustrated in FIGS. 3 through 5. The read only memory of the microprocessor 46 contains the instructions necessary to implement the algorithm as diagrammed in those figures. Referring first to FIG. 3, when power is first applied to the system from a vehicle battery 54 (FIG. 1) such as when a conventional vehicle ignition switch (not illustrated) is rotated to its "on" position, the computer program is initiated at a point 56 and then provides for system initialization at step 58 which entails clearing registers, initializing various RAM variables to calibrated values and other functions. When the initialization routine is completed, the program proceeds to perform antilock brake control functions as required. These antilock control functions are performed by executing a control cycle in response to each of repeated control cycle interrupts which are generated at predetermined fixed time intervals such as 5 milliseconds. Upon the occurrence of a control cycle interrupt, the digital computer begins executing the functions embodied in the control cycle. First, at step 60, wheel speed sensor information is read and wheel speed is computed for each of the vehicle wheels. Thereafter, the routine determines the individual wheel accelerations at step 62 and the individual wheel slip values at step 64. From the computed values of wheel acceleration and wheel slip, the program determines at step 66 whether or not those parameters represent the need for antilock brake pressure modulation for any wheel.

If antilock control of wheel brake pressure is not required, the program proceeds to perform background tasks at step 68. These tasks may include diagnostic functions as well as other functions. However, if step 66 determines that a need for antilock brake pressure modulation for any wheel is required, the program proceeds to a step 70 where antilock brake control functions are executed. Once those functions are executed, the program proceeds to the step 68 previously described.

The foregoing steps 60 through 70 are repeated once for each control cycle. Thus, when a control cycle interrupt occurs, a new cycle begins at step 60 and the functions represented by steps 60 through 70 are again repeated as previously described. Repeated executions of step 70 when antilock brake control is required establishes the general brake cycle as previously described wherein when the wheel slip and acceleration conditions represent an incipient wheel lockup condition, a pressure release phase is indicated and brake pressure is released to allow the wheel to recover from the incipient wheel lockup condition and when wheel acceleration and slip conditions represent a recovered condition, an apply phase is indicated and wheel pressure is re-applied and ramped until another incipient wheel lockup condition is sensed at which time the release phase is indicated and the cycle is repeated.

Referring to FIG. 4, there is illustrated a general flow diagram of the antilock brake control functions executed once for each braking channel where each channel includes a modulator 18. Where the four wheels of the vehicle are controlled independently, this requires the routine of FIG. 4 to be executed four times, once for each wheel with its related parameters. In another system, the rear brakes may be controlled by a single modulator such that the routine of FIG. 4 is then executed once for each front wheel and once for the combined rear wheels.

The antilock brake control routine 70 of FIG. 3 is entered at step 72 and then proceeds to a step 74 that selects the required brake mode. In general, the selection is made from a number of apply modes, such as three, each having a related rate of increase in brake pressure as a function of wheel acceleration and wheel slip and from a number of release modes such as three also as a function of wheel acceleration and wheel slip. The apply modes provide for progressively lower rates of increase in brake pressure with increasing values of wheel deceleration and increasing values of wheel slip which are representative of the wheel approaching the critical slip. As used herein, apply mode 1 provides for the highest rate of increase in brake pressure, apply mode 2 an intermediate rate of increase and apply mode 3 the lowest rate of increase in the brake pressure. The release modes are based on conditions of wheel slip and acceleration representing an incipient wheel lock condition and provide for control of release of the brake pressure in response to the incipient wheel lockup condition. For example, each release mode has associated therewith a calibrated period of rapid pressure release to provide a calibrated pressure reduction.

Step 76 then determines whether the brake mode determined at step 74 is one of the apply modes. If not, indicating one of the release modes was determined in response to an incipient lockup condition, the program proceeds to a step 78 which executes a brake release routine. In general, the brake release routine 78 provides for control of the torque motor 30 to release brake pressure to allow wheel recovery from the incipient wheel lockup condition.

When an incipient wheel lockup condition is first indicated by step 74 first indicating a brake release mode, the step 78 stores the commanded motor current as a representation of the motor current at the time the incipient wheel lockup condition is detected. This stored current value represents a measure of the brake pressure producing the maximum brake effort that corresponds to the wheel critical slip. Thereafter, with repeated executions of step 78 for the respective wheel, the brake pressure is released in accord with the release mode determined at step 74.

Repeated executions of the brake release routine 78 results in the wheel recovering from the incipient wheel lockup condition. This recovery condition is detected at step 74 when the mode retrieved from the lookup table corresponding to the wheel slip and acceleration values is one of the pressure apply modes. When step 76 determines that step 74 indicates a pressure apply mode, the program proceeds to a step 80 where a brake apply routine is executed. In this routine, the apply current is first set to a significant fraction of the current stored in step 78 when the incipient lockup condition was first detected. Thereafter, upon repeated executions of the step 80, the apply current is ramped at a controlled rate to increase the brake pressure at the wheel brake until an incipient wheel lockup condition is again sensed at step 74 when a release mode is determined via the lookup table in response to the wheel acceleration and slip values.

As the wheel brake pressure is ramped via repeated executions of the step 80, the ramp rate will be varied as the wheel parameters of slip and acceleration change resulting in a change in the particular brake apply mode established via step 74. In accord with this invention, a direct shift between modes 1 and 3 and their respective pressure ramp rates is inhibited even though the mode called for by step 74 otherwise calls for such a shift. This is accomplished by "filtering" the mode selected such that pressure ramp rates associated with modes 1 and 3 can be established only by first controlling the pressure ramp rate to the rate related to mode 2. This orderly transition between modes 1 and 3 provides for a limit in the rate of increase in the ramp rate of pressure and provides an orderly transition in changes in the pressure ramp rate.

The routine of step 74 for determining the brake mode is illustrated in FIG. 5. This routine is entered at step 82 and then determines at step 84 the unfiltered brake mode represented by the values of the wheel parameters of wheel slip and wheel acceleration. As previously indicated, this mode is obtained via a lookup table storing the particular brake mode corresponding to the specific combination of wheel slip and wheel acceleration. After determining the unfiltered brake mode established by the wheel parameters, the program determines at step 86 whether or not the mode retrieved represents brake apply or brake release. In accord with this invention, only the brake modes associated with the brake apply phase are filtered, whereas the brake release modes are executed according to the mode determined at step 84 without filtering.

Accordingly, if the mode established by step 84 is a release mode, the program proceeds to a step 88 where the brake mode is set to the unfiltered brake mode established at step 84. Thereafter, an old filtered value of the apply modes is set to mode 1 representing the fastest apply rate and a counter is cleared at step 90. Thereafter, the program exits the routine of 74 and proceeds to step 76 of FIG. 4.

Returning to step 86, if it is determined that the brake mode established by step 84 is one of the apply modes 1, 2 or 3, the program proceeds to a step 92 where the unfiltered brake mode retrieved at step 84 is compared to the old filtered value. It will be recalled that this old filtered mode was initialized to mode 1 at step 90 during the previous release phase as described. Assuming the unfiltered and old filtered apply modes are equal, the program clears the counter at step 94 and proceeds to set the brake mode equal to the old filtered mode at step 96. As long as the unfiltered brake mode remains at the old filtered brake mode, which is the apply mode last used to establish the brake pressure ramp rate, the brake mode remains constant via steps 92, 94 and 96. However, if step 92 determines that the unfiltered brake apply mode established at step 84 is not equal to the old filtered value, the program determines whether the unfiltered brake mode established at step 84 is the same as the unfiltered mode established during the prior execution of the control cycle. If not equal, the program clears the counter at step 94 and the brake mode is retained at the old filtered value at step 96. Step 98 imposes the condition that the unfiltered brake mode must be constant for two consecutive control cycles before the brake apply mode will be changed to establish a new brake pressure ramp rate.

Assuming step 98 determines that the unfiltered brake mode has been the same for two consecutive control cycles, the counter is incremented at step 100 after which the routine determines at step 102 whether or not the unfiltered brake mode established at step 84 is greater or less than the old filtered value representing the last brake mode used to establish the brake pressure ramp rate. If less than the old filtered value indicating the flow parameters represent conditions for increasing the pressure ramp rate, the program proceeds to step 104 where the counter is compared to a calibration constant K1. K1 establishes the maximum rate of increase in the pressure ramp rate. Assuming the counter has not been incremented via step 100 to K1, the program proceeds directly to step 96 where the brake mode is retained at the old filtered brake mode. However, when the counter has been incremented via step 100 to K1, the program proceeds to a step 106 where the old filtered brake mode is decremented, then to step 107 where the counter is cleared after which step 96 establishes the brake mode at the old filtered value as decremented at step 106. Keeping in mind that brake mode 2 is a faster ramp rate than brake mode 3 and brake mode 1 is a faster ramp rate than brake mode 2, step 106 provides for a shift to the next higher ramp rate independent of the unfiltered brake mode determined by step 84. In other words, if the previous brake mode established by the routine is brake mode 3, the routine provides for decrementing the brake mode to brake mode 2 at step 106 independent of step 84 which may have determined a brake mode 1 according to the then existing wheel parameters. Assuming step 84 determines an apply brake mode 1 for a plurality of control cycles, the foregoing steps will be repeated until such time that the counter is again incremented to K1 after which the old filtered brake mode is again decremented at step 106 to establish the brake mode 1. In this manner, an orderly transition is established in going from brake mode 3 to brake mode 1 and at a rate established by the calibration constant K1.

Similarly, the routine provides for an orderly transition from brake mode 1 to brake mode 3. Assuming the conditions of step 92 and 98 are established and the unfiltered brake mode is greater than the old filtered brake mode, the counter is incremented at step 100 and the program proceeds to a step 108 from step 102 wherein the counter value is compared to a calibration constant K2. Assuming the counter has not attained the count K2, the brake mode is established at the prior old filtered value. However, if the step 108 determines that the counter has been incremented to K2, the old filtered brake mode is incremented at step 110 after which the counter is cleared at step 111. Step 96 then establishes the brake mode at the old filtered value incremented at step 110 to provide for a decrease in the ramp rate corresponding to the new brake mode. If the unfiltered brake mode established at step 84 is brake apply mode 3, the foregoing steps are repeated such that after the time interval K2, the old filtered value is again incremented at step 110 to establish brake apply mode 3.

As with steps 104 and 106, steps 108 and 110 provide for an orderly increase in the brake modes and therefore decrease in the pressure ramp rates by inhibiting a direct transition from brake mode 1 to brake mode 3. Further, K2 establishes the maximum rate at which the transitions are permitted between brake modes and therefore the maximum rate of decrease in the apply pressure ramp rate transitions between pressure ramp rates. In general, K2 is less than K1 so as to allow for a more rapid rate of change in ramp rates when the wheel parameters are approaching an incipient wheel lockup condition calling for a decrease in the pressure ramp rates.

In the foregoing manner, a pressure ramp rate provided during the apply phase of the antilock brake control cycle is varied in an orderly manner by inhibiting the bypassing of an intermediate ramp rate independent of the ramp rate otherwise called for by the wheel parameters. This provides for a more orderly control of the wheel brake pressure to establish a more stable braking condition.

The foregoing description of a preferred embodiment of the invention for purposes of illustrating the invention is not to be considered as limiting or restricting the invention, since many modifications may be made by the exercise of skill in the art without departing from the scope of the invention.

The embodiments of the invention in which an exclusive property or privilege is claimed are defined as follows:

1. A method of controlling the brake pressure applied to the brake of a vehicle wheel traveling over a road surface, the method comprising the steps of:

releasing the brake pressure in response to an incipient wheel lockup condition to allow wheel recovery from the incipient wheel lockup condition;

in response to wheel recovery from the incipient wheel lockup condition, recurrently (A) determining the values of predetermined wheel parameters, (B) determining a pressure apply ramp rate from a schedule of sequential ramp rates as a function of the determined values of the predetermined wheel parameters and (C) filtering the determined pressure apply ramp rate to form a filtered ramp rate by selecting a next higher ramp rate from the schedule of sequential ramp rates when the determined pressure apply ramp rate is greater than a last filtered pressure apply ramp rate and selecting a next lower ramp rate from the schedule of sequential ramp rates when the determined pressure apply ramp rate is less than the last filtered pressure apply ramp rate; and ramping the apply pressure following wheel recovery in accord with the filtered pressure apply ramp rate.

2. The method of claim 1 wherein the predetermined wheel parameters are wheel spin and wheel acceleration.

3. A method of controlling the brake pressure applied to the brake of a vehicle wheel traveling over a road surface, the method comprising the steps of:

releasing the brake pressure in response to an incipient wheel lockup condition to allow wheel recovery from the incipient wheel lockup condition;

repeatedly determining a pressure apply ramp rate following wheel recovery as a function of predetermined wheel parameters;

limiting the rate of change in the determined pressure apply ramp rate; and ramping the brake pressure following wheel recovery in accord with the limited rate of change in the determined pressure apply ramp rate.

4. A system for controlling the brake pressure applied to the brake of a vehicle wheel traveling over a road surface, the system comprising in combination:

means for storing a schedule of sequential brake pressure apply ramp rates as a function of predetermined wheel parameters;

means for releasing the brake pressure in response to an incipient wheel lockup condition to allow wheel recovery from the incipient wheel lockup condition;

means responsive to wheel recovery from the incipient wheel lockup condition for recurrently (A) measuring the values of the predetermined wheel parameters, (B) determining a pressure apply ramp rate from the stored schedule of sequential ramp rates corresponding to the measured values of the predetermined wheel parameters and (C) filtering the determined pressure apply ramp rate to form a filtered ramp rate by selecting a next higher ramp rate from the stored schedule of sequential pressure apply ramp rates when the determined pressure apply rate is greater than a last filtered pressure apply ramp rate and selecting a next lower ramp rate from the stored schedule of sequential ramp rates when the determined pressure apply ramp rate is less than the last filtered pressure apply ramp rate; and means for ramping the apply pressure following wheel recovery in accord with the filtered pressure apply ramp rate.

* * * * *